United States Patent
Agarwal et al.

(10) Patent No.: US 9,800,686 B2
(45) Date of Patent: Oct. 24, 2017

(54) DETERMINING PACKET PRIORITY BASED ON A LOCATION ASSOCIATED WITH A CLIENT DEVICE

(71) Applicant: Aruba Networks, Inc., Sunnyvale, CA (US)

(72) Inventors: Gopal Agarwal, Bangalore (IN); Anupam Wadhawan, Sunnyvale, CA (US); Navaneetha Krishna Gowda Thippesh, Bangalore (IN)

(73) Assignee: Aruba Networks, Inc., Sunnyvale, CA (US)

( * ) Notice: Subject to any disclaimer, the term of this patent is extended or adjusted under 35 U.S.C. 154(b) by 167 days.

(21) Appl. No.: 14/170,531

(22) Filed: Jan. 31, 2014

(65) Prior Publication Data

US 2015/0222727 A1  Aug. 6, 2015

(51) Int. Cl.
*G06F 15/16* (2006.01)
*H04L 29/08* (2006.01)
*H04L 12/927* (2013.01)
*H04L 12/851* (2013.01)
*H04W 4/02* (2009.01)
*H04W 72/12* (2009.01)

(52) U.S. Cl.
CPC ........ *H04L 67/322* (2013.01); *H04L 47/2433* (2013.01); *H04L 47/805* (2013.01); *H04L 67/18* (2013.01); *H04W 4/02* (2013.01); *H04W 72/12* (2013.01)

(58) Field of Classification Search
CPC ..... H04L 47/805; H04L 67/18; H04L 67/322; H04L 67/327; H04W 4/028; H04W 4/021; H04W 4/023; H04W 4/02; H04W 4/025; H04W 52/0251; H04W 64/00
See application file for complete search history.

(56) References Cited

U.S. PATENT DOCUMENTS

| | | | | |
|---|---|---|---|---|
| 9,614,733 | B1* | 4/2017 | Sussman | G06F 9/50 |
| 2002/0004796 | A1* | 1/2002 | Vange | G06F 9/5027 |
| 2002/0097746 | A1* | 7/2002 | McDonald | H04L 12/1827 370/468 |
| 2007/0014276 | A1* | 1/2007 | Bettink | H04L 45/00 370/351 |
| 2007/0206599 | A1* | 9/2007 | Bhalala | H04L 45/00 370/392 |
| 2012/0173897 | A1* | 7/2012 | Karkaria | G06F 9/445 713/300 |
| 2014/0003342 | A1* | 1/2014 | Sheriff | H04W 76/02 370/328 |
| 2014/0195530 | A1* | 7/2014 | Milton | G06Q 30/02 707/734 |
| 2014/0372591 | A1* | 12/2014 | Payette | H04L 65/60 709/223 |

(Continued)

*Primary Examiner* — Hamza Algibhah
(74) *Attorney, Agent, or Firm* — Brooks, Cameron & Huebsch, PLLC (57) ABSTRACT

A non-transitory computer readable medium storing instructions which, when executed by one or more hardware processors, causes performance of operations including: determining a location associated with a client device, assigning a priority to packets, received from the client device or targeted for the client device, based at least on the location associated with the client device, and processing packets based on the priority assigned to the packets.

20 Claims, 6 Drawing Sheets

(56) References Cited

U.S. PATENT DOCUMENTS

| | | | |
|---|---|---|---|
| 2015/0016247 A1* | 1/2015 | Hayes | H04L 47/127 370/230 |
| 2015/0038162 A1* | 2/2015 | Duleba | H04W 4/028 455/456.1 |
| 2015/0052239 A1* | 2/2015 | Lamarca | H04L 41/5029 709/224 |

* cited by examiner

DETERMINING PACKET PRIORITY BASED ON A LOCATION ASSOCIATED WITH A CLIENT DEVICE

BACKGROUND

Many types of network traffic are transmitted on enterprise networks. Some of the traffic may provide real-time communications (such as voice communication). However, when the network is experiencing higher levels of traffic, the real-time communications can become difficult or impossible to use. In response to this, some enterprise networks are configured to give real-time communication traffic priority over other traffic on the network. This is accomplished by differentiating the data based on the characteristics of the real-time data, such as protocol type and port. However, differentiating data can be frustrated by applications that encrypt the data before transmitting it on the network.

OVERVIEW

In general, in one aspect, embodiments relate to a non-transitory computer readable medium comprising instructions which, when executed by one or more hardware processors, causes performance of operations. The operations comprise: determining a location associated with a client device; assigning a priority to packets, received from the client device or targeted for the client device, based at least on the location associated with the client device; and processing packets based on the priority assigned to the packets.

In general, in one aspect, embodiments relate to a system. The system comprises: at least one device including a hardware processor; the system being configured to perform the operations comprising: determining a location associated with a client device; assigning a priority to packets, received from the client device or targeted for the client device, based at least on the location associated with the client device; and processing packets based on the priority assigned to the packets.

In general, in one aspect, embodiments relate to a method. The method comprises: determining a location associated with a client device; assigning a priority to packets, received from the client device or targeted for the client device, based at least on the location associated with the client device; and processing packets based on the priority assigned to the packets.

Other aspects will be apparent from the following description and the appended claims.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that embodiments may be practiced without these specific details. In other instances, well-known features have not been described in detail to avoid unnecessarily complicating the description.

In general, embodiments provide a method and system for prioritizing real-time traffic based on the physical location of a client device. Specifically, embodiments may be used to recognize the physical location of a client device being used for real-time communication, and to process the data for that session according to policies associated with the physical location of the client device.

In a typical enterprise deployment scenario, voice calls or other real-time communications made by wireless clients in certain zones are of higher importance than calls made in other zones. For example, the chief executive officer's (CEO)'s office, corporate command center, and conference room may be recognized as higher priority zones. Similarly, other zones that are of lower importance, such as cafeterias and lounges, may be labelled as low priority zones. The location context of real-time communications is used by the network hardware to prioritize some network traffic over other network traffic.

Network location awareness fundamentally describes the location of a node in the network. A typical network monitor works by building a virtual perimeter for real-world geographic areas. This makes it possible to identify certain zones that house users for whom collaborative real-time communication is critical.

In one or more embodiments, determining a location for a wireless client is based on information from the access point for that client device. The determination of the location may also be made based on information from other access points within range of the wireless client. Each access point may report connection information (such as signal strength) to a location monitor. The location monitor may then use the information from multiple access points to determine whether the wireless client is in a high-priority zone. Once the location monitor determines the current zone of the wireless client, the location monitor instructs the access point and gateway to process packets from the wireless client according to the priority assigned to the zone.

Figure 1:
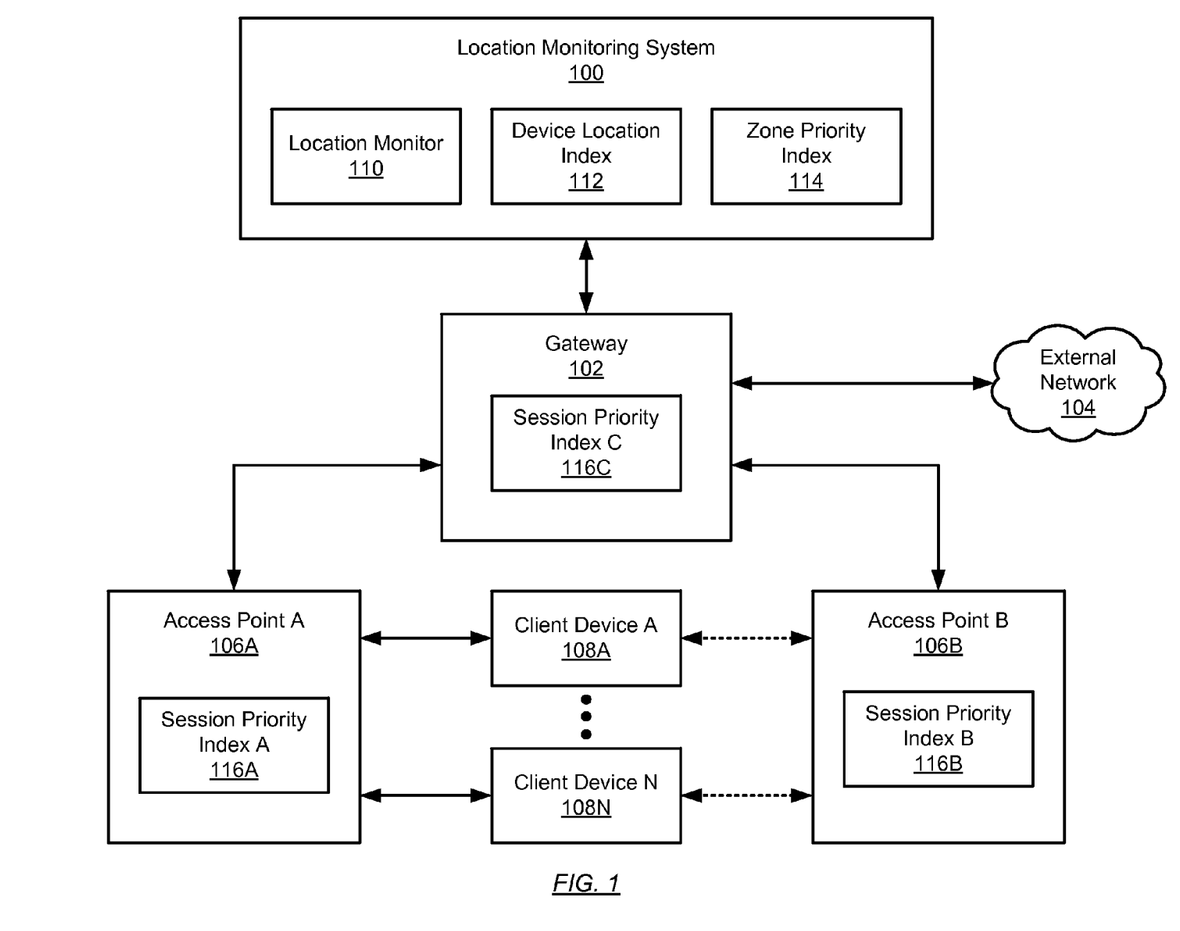
FIG. 1 shows a system in accordance with one or more embodiments.

FIG. 1 shows a diagram of a system in accordance with one or more embodiments. As shown in FIG. 1, the system includes a location monitoring system (100), a gateway (102) connected to an external network (104), multiple access points (access point A (106A), access point B (106B)) and multiple client devices (client device A (108A), client device N (108N)). The location monitoring system (100) includes a location monitor (110), a device location index (112), and a zone priority index (114). Access point A (106A) includes session priority index A (116A). Access point B (106B) includes session priority index B (116B). Gateway (102) includes session priority index C (116C). The location monitoring system (100), gateway (102), access points (access point A (106A), access point B (106B)), and client devices (client device A (108A), client device N (108N)) make up part of an IP subnet.

In one or more embodiments, the location monitoring system (100) is a computer system or group of computer systems configured to execute the location monitor (110), device location index (112), and zone priority index (114). In one or more embodiments, the location monitor (110), device location index (112), and/or the zone priority index (114) are located on the gateway (102), an access point (access point A (106A), access point B (106B)) or another computer system or network device (e.g., controller, switch, etc.) on the network.

In one or more embodiments, the location monitor (110) is a process or group of processes with functionality to monitor the location of client devices (client device A (108A), client device N (108N)) on the IP subnet. Specifically, the location monitor (110) may receive location updates from access points (106A, 106B)) and use the information from the location updates to determine the physical location of a client device. Location updates may be received from the access point (access point A (106A), access point B (106B)) to which the client device (client device A (108A), client device N (108N)) is currently connected. Location updates may also be received from other access points (access point A (106A), access point B (106B)) within detectable range of the client device. Location updates may also be received directly from client devices (client device A (108A), client device N (108N)).

In one or more embodiments, the device location index (112) is a process or group of processes with functionality to store a client device identifier (such as a media access control (MAC) address or internet protocol (IP) address) keyed to a physical location and/or zone identifier. In one or more embodiments, the device location index (112) includes functionality to service queries from the location monitor (110) for the location/zone of a given client device (client device A (108A), client device N (108N)). In one or more embodiments, the physical location is stored in terms of global positioning system (GPS) coordinates, physical address, building and floor number, room number, or any other manner in which physical location may be stored.

In one or more embodiments, the zone identifier identifies the zone corresponding to the physical location. In one or more embodiments, a zone is a subdivision of the total physical area serviced by the access points (access point A (106A), access point B (106B)) of the IP subnet. Specifically, a zone is an collection of physical locations with an assigned priority. Examples of zone identifiers include "cafeteria," "lobby," "second floor," "bldg-A/rm-45" and "Mr. Smith's office."

In one or more embodiments, the zone priority index (114) is a process or group of processes with functionality to store a zone identifier keyed to a priority. In one or more embodiments, the zone priority index (114) includes functionality to service queries from the location monitor (110) for the priority for a given zone. Examples of priority include "high," "low," "1," and "5".

In one or more embodiments, the gateway (102) is a network device or group of network devices with functionality to facilitate communication between client devices (client device A (108A), client device N (108N)) and devices outside of the IP subnet connected to the external network (104). In one or more embodiments, traffic addressed to devices outside of the IP subnet is first directed to the gateway (102) before being sent to the external network (104). In one or more embodiments, the gateway (102) also provides network address translation (NAT) services to other network devices (such as access points (access point A (106A), access point B (106B)) and client devices (client device A (108A), client device N (108N))).

In one or more embodiments, each access point (access point A (106A), access point B (106B)) is a network device or group of network devices with functionality to facilitate access between client devices (client device A (108A), client device N (108N)) and other devices on the IP subnet. Such access may be wireless access and/or wired access. Further, access points (access point A (106A), access point B (106B)) may also include functionality to authenticate client devices (client device A (108A), client device N (108N)) for access to a network.

In one or more embodiments, the access points (access point A (106A), access point B (106B)) also include functionality to obtain information about client devices (client device A (108A), client device N (108N)) within detectable range. Specifically, the access points (access point A (106A), access point B (106B)) may obtain information about client devices (client device A (108A), client device N (108N)) connected to the access point (in other words, using the access point for access to the IP subnet) as well as those client devices (client device A (108A), client device N (108N)) that are not connected to the access point (access point A (106A), access point B (106B)). Such information may include, for example, signal strength and/or ping rate. As shown in FIG. 1, client device A (108A) and client device N (108N) are connected to access point A (106), but are still detectable by access point B (106B).

In one or more embodiments, the network devices (gateway (102), access point A (106A), access point B (106)) include functionality to distinguish between different types of sessions. In one or more embodiments, a session is a series of exchanged data between two or more client devices (client device A (108A), client device N (108N)) using a particular protocol. A real-time session is a session that requires low-latency to be functional. Real-time sessions include, for example, voice over IP, and video calls. In one or more embodiments, the network devices distinguish between types of sessions by reading a portion of the contents or header of one or more data packets being exchanged between client devices (client device A (108A), client device N (108N)).

In one or more embodiments, each client device (client device A (108A), client device N (108N)) is a user system implemented as a computing device with functionality to interact with the access point (access point A (106A), access point B (106B)) and other network devices on the IP subnet. In one or more embodiments, each client device (client device A (108A), client device N (108N)) is a computer system used by a user to gain access to one or more other elements connected to the IP subnet and the external network (102). The client devices (client device A (108A), client device N (108N)) may include a network interface (not shown) used to send and receive messages to other devices. Examples of client devices (client device A (108A), client device N (108N)) include, but are not limited to, desktop computers, laptop computers, tablet computers, and smartphones.

In one or more embodiments, the session priority indexes (session priority index A (116A), session priority index B (116), session priority index C (116C)) are processes or group of processes with functionality to store a session identifier keyed to a session priority. In one or more embodiments, the session priority indexes (session priority index A (116A), session priority index B (116), session priority index C (116C)) include functionality to service queries from other elements on the network device (gateway (102), access point A (106A), access point B (106B)) for the session priority of a given session. A session identifier is information that uniquely identifies a session (for example, a combination of port number and IP addresses of the involved client devices).

Figure 2:
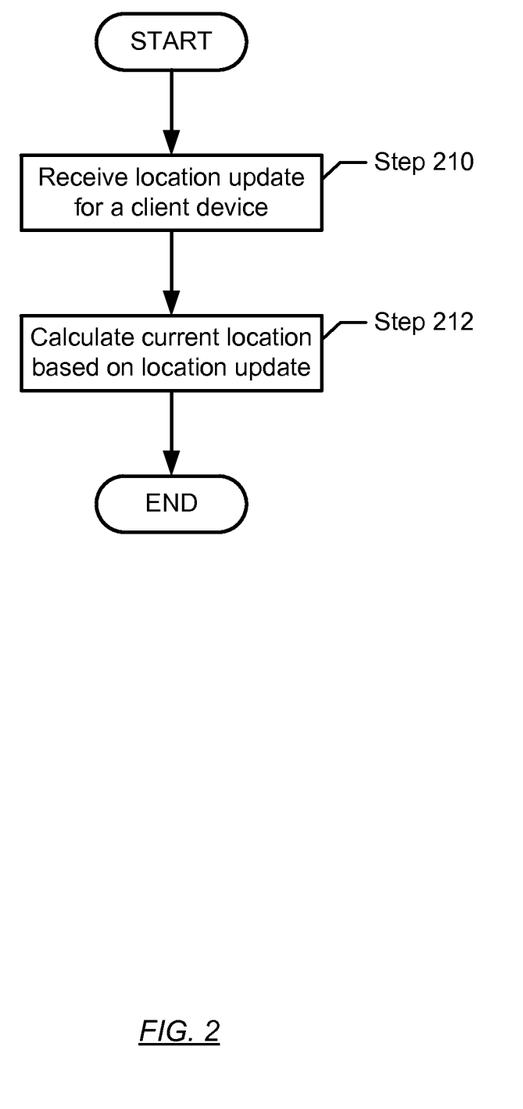
FIG. 2 shows a flow diagram in accordance with one or more embodiments.

FIG. 2 shows a flowchart for receiving location updates in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 210, the location manager receives a location update for a client device from an access point. In one or more embodiments, location updates are messages that provide information regarding the physical location of a client device. Location updates may include information such as signal strength, ping rate, and/or GPS coordinates. Location updates may be sent at regular intervals and/or when the access point detects that the location of a client device has changed.

In Step 212, the location manager calculates the current location of the client device based on the location update. In one or more embodiments, the current location of a client device may be determined using information from a single location update (for example, GPS coordinates). In one or more embodiments, determining the current location of a client device uses multiple location updates from two or more access points connected to or able to detect the client device.

Figure 3:
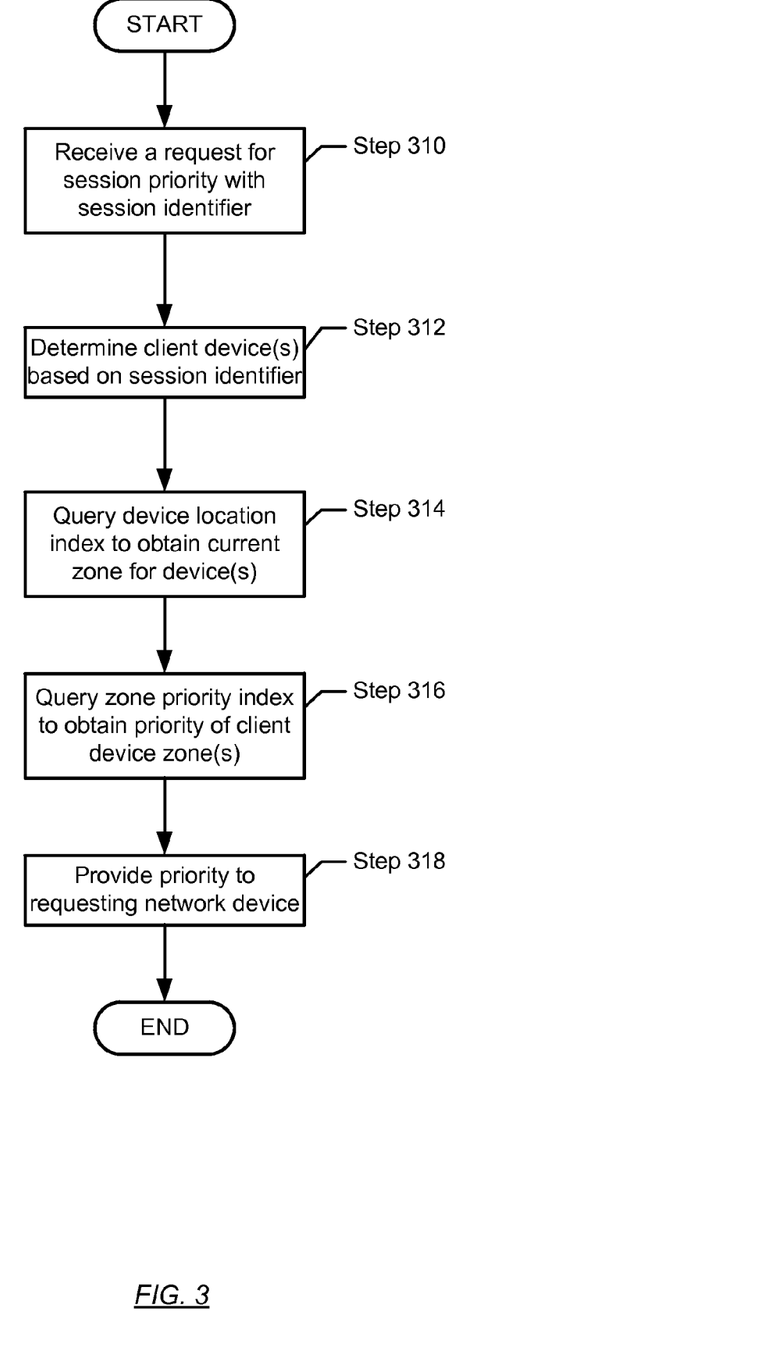
FIG. 3 shows a flow diagram in accordance with one or more embodiments.

FIG. 3 shows a flowchart for servicing requests for session priority in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 310, the location manager receives a request for a session priority with a session identifier and/or a client device identifier. In one or more embodiments, the client device identifier is derived by the network device (for example, access point, gateway, etc.). In Step 312, the location manager determines the client device(s) participating in the session based on the session identifier. In one or more embodiments, the location manager derives the session identifier using a client device identifier received from the network device.

In Step 314, the location manager queries the device location index with the client device identifier(s) to obtain the current physical location and/or zone of the client device(s). In one or more embodiments, the location manager derives the zone from the physical location to obtain the zone identifier. In one or more embodiments, the physical location identifies a point within a zone. In one or more embodiments, deriving a zone from a physical location includes determining whether the physical location is within the geographic area designated a zone.

In Step 316, the location manager queries the zone priority index with the zone identifier to obtain the priority for the session. In Step 318, the location manager provides the priority for the session to the requesting network device (for example, access point, gateway, etc.).

In one or more embodiments, priorities are assigned using historical location information in addition to current location information. In one or more embodiments, if a client device spends a particular percentage of the workday located in a high priority zone, the location manager may assume that the device belongs to a resident of the high-priority zone. Consequently, the location manager may have all sessions involving that client device assigned a high priority (regardless of the current location of the client device). For example, a smartphone that is located in the CEO's office 60% of the workday may have all real-time sessions designated high-priority.

In one or more embodiments, session priorities may be maintained when a client device crosses a zone boundary. For example, a session may retain the priority of the zone in which the session was initiated. For example, a call initiated in the CEO's office may maintain a high-priority even as the CEO's device is moved into a low-priority zone. Alternatively, the session may maintain the higher priority of the previous zone and the current zone. For example, a session initiated in the lobby of a building (a low-priority zone) may be upgraded when the client device moves into an executive office (a high-priority zone).

Figure 4:
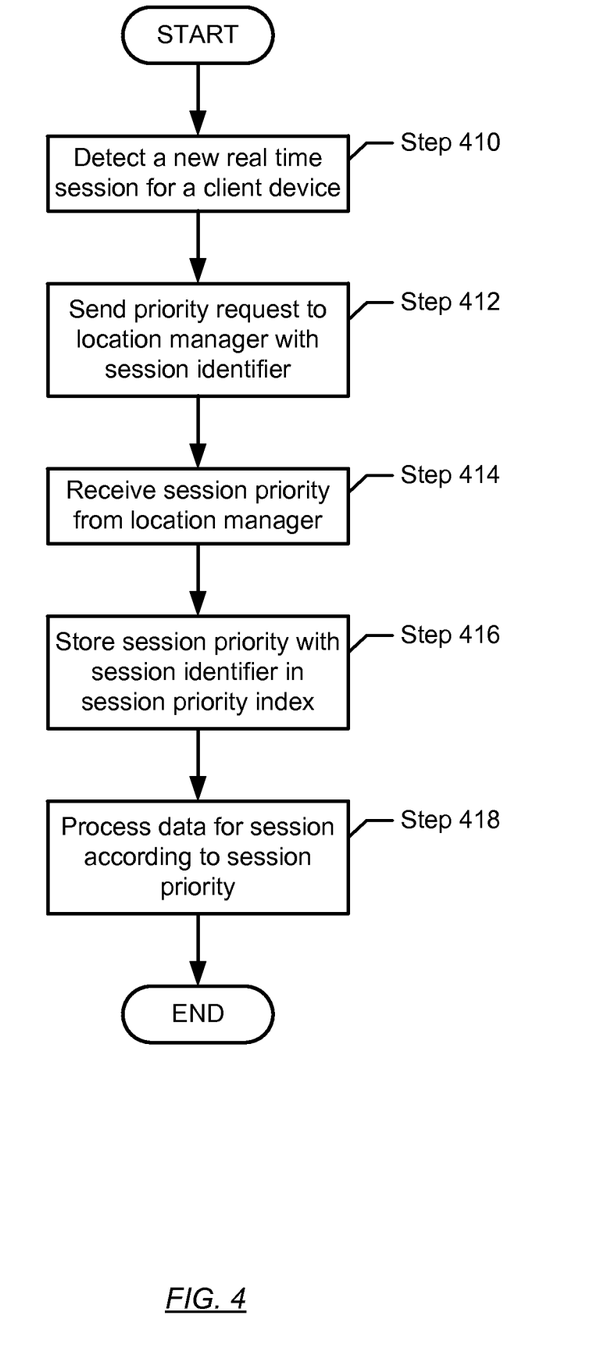
FIG. 4 shows a flow diagram in accordance with one or more embodiments.

FIG. 4 shows a flowchart for obtaining a priority for a session in accordance with one or more embodiments. While the various steps in the flowchart are presented and described sequentially, one of ordinary skill will appreciate that some or all of the steps may be executed in different orders, may be combined or omitted, and some or all of the steps may be executed in parallel.

In Step 410, the network device (for example, access point, gateway, etc.) detects that a new real-time session has been initiated by a client device connected to the network device. In one or more embodiments, a network device detects a real-time session by inspecting data packets for indications that the data packet is part of a real-time session.

In one or more embodiments, a new real-time session may be a real-time session initiated while the client device is connected to the network device. Alternatively, the real-time session may have been initiated by the client device while connected to a different network device and has roamed from the original network device to the current network device.

In Step 412, the network device sends a priority request to the location manager with the session identifier and/or client device identifier. In Step 414, the network device receives the session priority from the location manager in response to the priority request. In Step 416, the network device stores the session priority keyed to the session identifier in the session priority index.

In Step 418, the network device processes the data for the session according to the priority. In one or more embodiments, processing the data refers to the manner in which data packets for the session are handled by the network device. In one or more embodiments, the manner in which a packet is processed and the manner in which the priority is honored depends on the type and abilities of the network device. For example, some network devices may include functionality to dedicate a subset of hardware resources to processing high-priority session data. In one or more embodiments, a priority may be honored by altering the manner in which the data is queued for routing by the network device. Processing packets may include storing information in the packet headers using technologies such as differentiated services code point (DSCP) and Wi-Fi multimedia (WMM).

In one or more embodiments, processing the data for a session includes transmitting (wired or wirelessly) the packets using transmission parameters. In one or more embodiments, the transmission parameters are based on the physical location associated with the client device. Such transmission parameters may include Enhanced Distributed Channel Access (EDCA) parameters. Further, such transmission parameters may designate the traffic as a particular type (for example, background, best effort, video, voice, etc.).

In one or more embodiments, processing packets according to a priority may include activities beyond packet handling. In one or more embodiments, processing packets according to a priority includes routing the packets through the network using different hardware and/or network devices. For example, some high-priority sessions may be rerouted to use primarily wired transmission.

Figure 5:
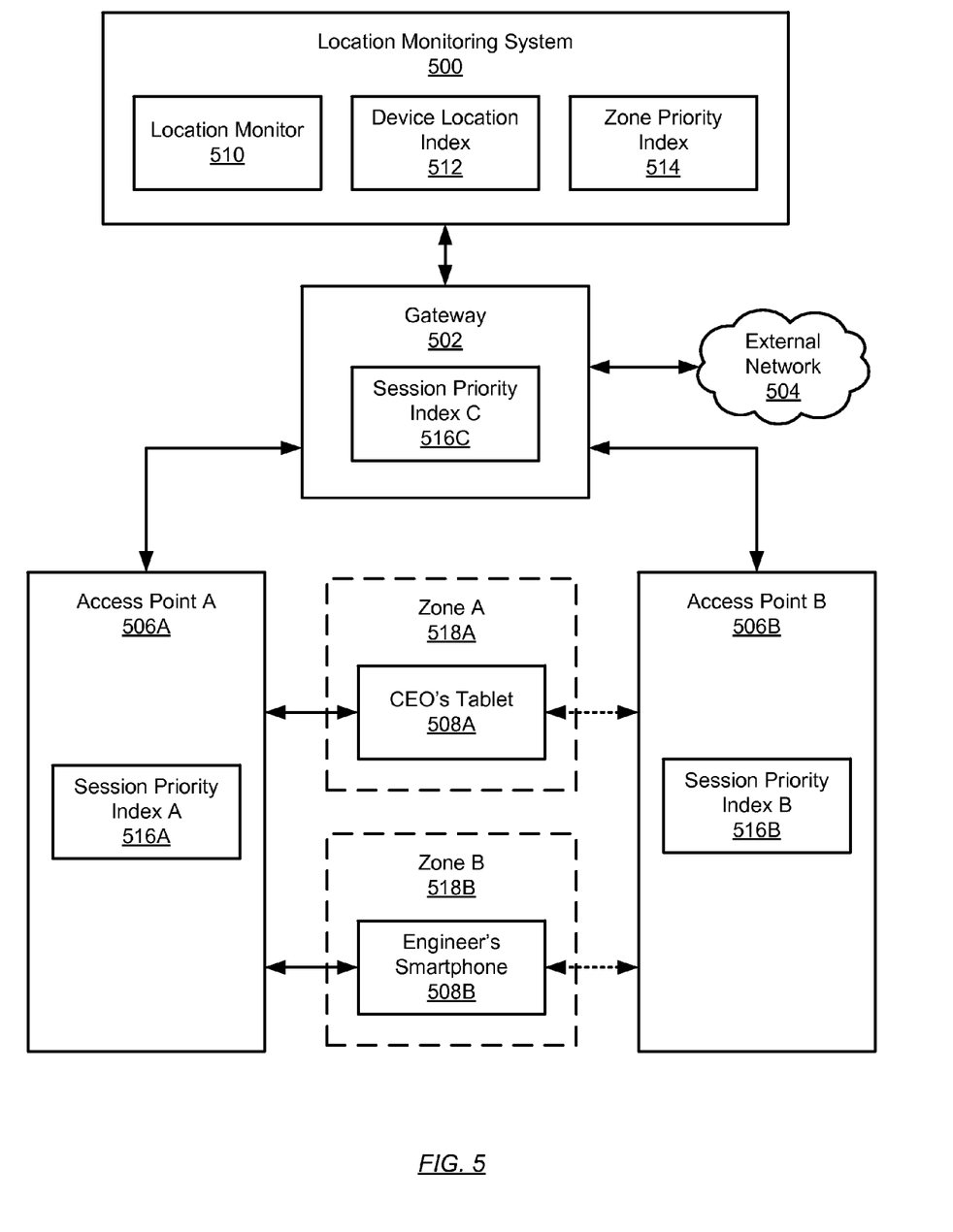
FIG. 5 shows an example in accordance with one or more embodiments.

FIG. 5 shows an example in accordance with one or more embodiments. As shown in FIG. 5, the example includes a location monitoring system (500), a gateway (502) connected to an external network (504), multiple access points (access point A (506A), access point B (506B)) and multiple client devices (client device A (508A), client device N (508N)). The location monitoring system (500) includes a location monitor (510), a device location index (512), and a zone priority index (514). Access point A (506A) includes session priority index A (516A). Access point B (506B) includes session priority index B (516B). Gateway (502) includes session priority index C (516C). The location monitoring system (500), gateway (502), access points (access point A (506A), access point B (506B)), and client devices (CEO's tablet (508A), engineer's smartphone (508B)) make up an IP subnet. The CEO's tablet (508A) is located in zone A (518A) and the engineer's smartphone (508B) is located in zone B (518B).

For the purposes of the example, assume that zone A (518A) and zone B (518B) are two geographic areas within a large software company housed in a building. Assume that zone A (518A) is an area centered around the office of the CEO. Assume further that zone B (518B) is the lobby of the building. Further, assume zone A (518A) has been designated high-priority and zone B (518B) has been designated low-priority.

Once authenticated on the network, the physical location of the client devices (CEO's tablet (508A), engineer's smartphone (508B)) is monitored by both access point A (506A) and access point B (506B). Periodic location updates are sent to the location monitor (510) on the location monitoring system (500). The location monitor then uses the collection of location updates to determine that the CEO's tablet (508A) is currently located in zone A (518A) and the engineer's smartphone (508B) is currently located in zone B (518B).

Assume that the engineer, using her smartphone (508B), initiates a video call over the IP subnet to a friend connected to the external network (504). Access point A (506A) detects the initiation of the video call. Access point A (506A) extracts the client identifier (the IP address assigned to the engineer's smartphone (508B)) from a packet of the video call and sends a priority request to the location monitor (510) with the client identifier to determine the priority of the real-time session.

The location monitor (510) receives the priority request and queries the device location index (512) to determine the current zone for the engineer's smartphone (508B), and receives zone B (518B) in response. The location monitor (510) then queries the zone priority index to obtain the priority for zone B (518B) which is low-priority. The location monitor (510) then sends a response to the priority request informing access point A (506A) to processes data for the real-time session with a low-priority.

Access point A (506A) receives the response to the priority request from the location monitor (510), and stores the session identifier of the real-time session in session priority index A (516A) keyed to a priority of "low."

According to the configuration of access point A (506A), real-time sessions with a priority of "low" are processed using a standard routing queue. Therefore, the packets of the video call between the engineer's smartphone (508B) and her friend's device are processed by access point A (506A) using the standard routing queue.

The packets for the engineer's video call are then transmitted to the gateway (502). The gateway (502) extracts the client identifier from a packet of the video call and sends a priority request to the location monitor (510) with the client identifier to determine the priority of the real-time session. The gateway (502) receives a priority of "low" and stores the session identifier of the real-time session in session priority index C (516C) keyed to a priority of "low." The gateway (502) then processes the incoming and outgoing packets for the real-time session according to a priority of "low."

Next, assume that a business partner of the CEO initiates a voice call to the CEO's tablet (508A). The gateway (502) detects the voice call and extracts the client identifier (the IP address assigned to the CEO's tablet (508A)) from a packet of the voice call and sends a priority request to the location monitor (510) with the client identifier to determine the priority of the real-time session.

The location monitor (510) receives the priority request and queries the device location index (512) to determine the current zone for the CEO's tablet (508A), and receives zone A (518A) in response. The location monitor (510) then queries the zone priority index to obtain the priority for zone A (518A) which is high-priority. The location monitor (510) then sends a response to the priority request informing the gateway (502) to processes data for the real-time session with a high-priority.

The gateway (502) receives the response to the priority request from the location monitor (510), and stores the session identifier of the real-time session in session priority index C (516C) keyed to a priority of "high." Packets of the voice call between the business partner and the CEO's tablet (508A) are processed by the gateway (502) according to a high-priority.

The packets for the CEO's voice call are then transmitted to access point A (506A). Access point A (506A) extracts the client identifier from a packet of the video call and sends a priority request to the location monitor (510) with the client identifier to determine the priority of the real-time session. Access point A (506A) receives a priority of "high" and stores the session identifier of the real-time session in session priority index A (516A) keyed to a priority of "high." Access point A (506A) then processes the incoming and outgoing packets for the real-time session according to a priority of "high" by placing the packets in the high-priority queue.

Assume that during the two real-time sessions (the video call and the voice call) traffic on the IP subnet increases. In order to maintain the quality of service for the CEO's voice call, the gateway (502) and access point A (506A) slow down or drop packets associated with the engineer's video call. When the traffic increases further, the engineers call is dropped completely in order to maintain the quality of service for the CEO's call.

Figure 6:
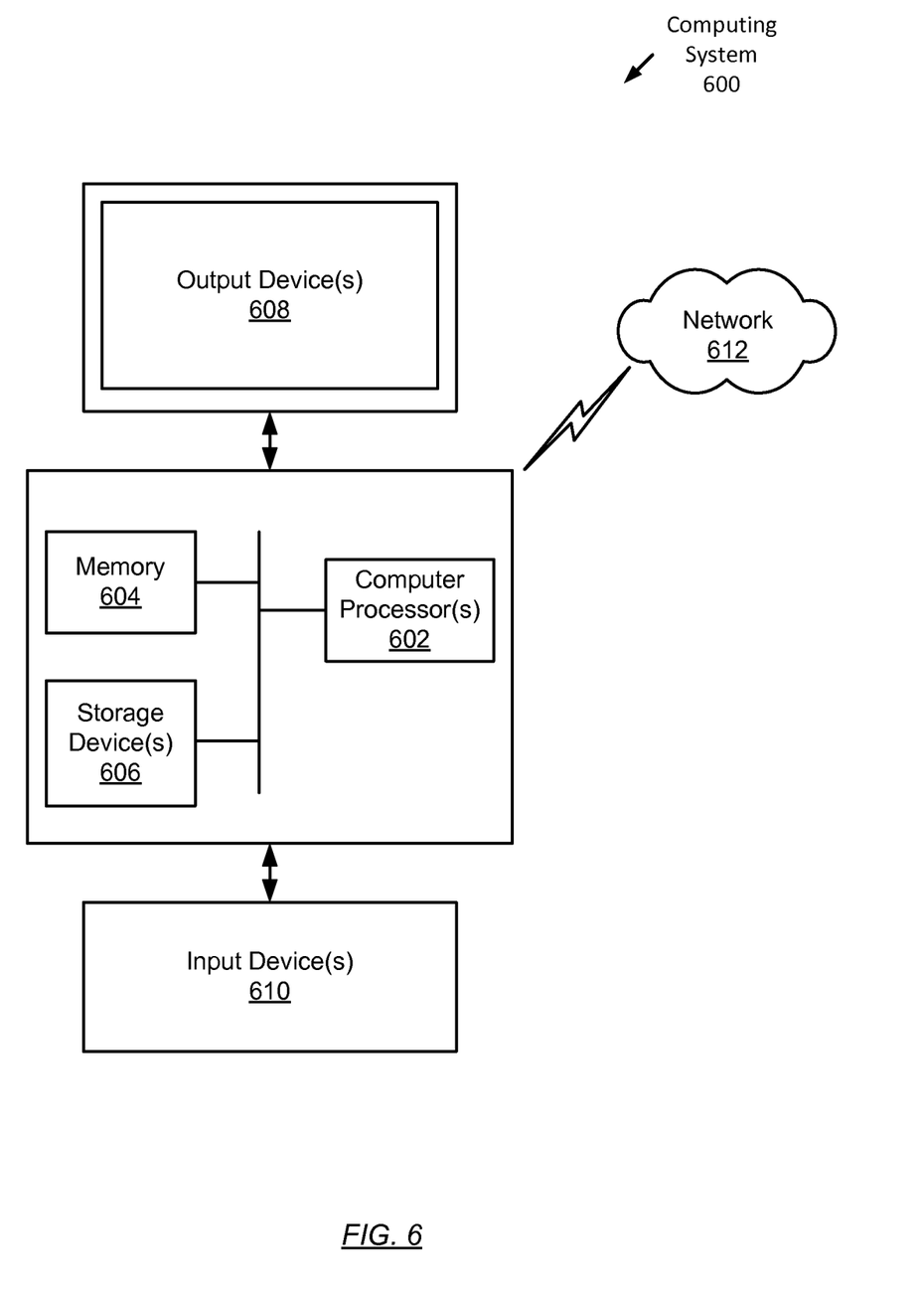
FIG. 6 shows a computer system in accordance with one or more embodiments.

Embodiments may be implemented on virtually any type of computing system regardless of the platform being used. For example, the computing system may be one or more mobile devices (for example, laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 6, the computing system (600) may include one or more computer processor(s) (602), associated memory (604) (for example, random access memory (RAM), cache memory, flash memory, etc.), one or more storage device(s) (606) (for example, a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (for example, a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (for example, a local area network (LAN), a wide area network (WAN) such as the Internet, mobile network, or any other type of network) via a network interface connection (not shown). The input and output device(s) may be locally or remotely (for example, via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (600) may be located at a remote location and connected to the other elements over a network (612). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While embodiments have been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A non-transitory computer readable medium comprising instructions which, when executed by a processor causes the processor to:
   determine a first location associated with a first client device and a second location associated with a second client device;
   assign a first priority to packets received from the first client device or targeted for the first client device, based on the first location and historical location information associated with the first client device;
   assign a second priority to packets received from the second client device or targeted for the second client device, based on the second location and historical location information associated with the second client device, wherein the first priority and the second priority are different;
   process packets received from or targeted for the first client device based on the first priority and processing packets received from or targeted to the second client device based on the second priority; and
   select session parameters for a first session corresponding to the packets based on the first priority and a second session corresponding to the packets based on the second priority assigned to the packets; and
   reduce a number of processed packets associated with the second session while maintaining a number of processed packets associated with the first session.

2. The non-transitory computer readable medium of claim 1, wherein the first location associated with the first client device is a current location of the first client device.

3. The non-transitory computer readable medium of claim 1, wherein the first location associated with the first client device is a previous location of the first client device that is not a current location of the first client device.

4. The non-transitory computer readable medium of claim 1, wherein the first location associated with the first client device is a previous location of the first client device when the session was initiated by the first client device, the packets corresponding to the session, wherein the previous location of the first client device is different from a current location of the first client device.

5. The non-transitory computer readable medium of claim 1, wherein the first location associated with the first client device is a location at which the first client device is located at for a majority of time that the first client device is detected.

6. The non-transitory computer readable medium of claim 1, wherein the first location and the second location each identify a three dimensional space.

7. The non-transitory computer readable medium of claim 1, wherein the instructions to process the packets comprise instructions to wirelessly transmit the packets using transmission parameters that are based on the first location associated with the first client device.

8. The non-transitory computer readable medium of claim 1, wherein the instructions to process the packets comprise instructions to transmit the packets on a wired medium from available wireless and wired mediums based on the priority that is based on the first location associated with the first client device.

9. The non-transitory computer readable medium of claim 1, wherein the instructions to process the packets comprise instructions to store priority information indicating the priority in the packets and forwarding the packets with the priority information.

10. The non-transitory computer readable medium of claim 1, wherein the priority assigned to the packets defines a guaranteed level of Quality of Service (QoS).

11. The non-transitory computer readable medium of claim 1, wherein the packets comprise a request for a call, and wherein processing the packets comprises:
   accepting or rejecting the call based at least on the first location associated with the first client device.

12. A system comprising:

at least one device including a hardware processor;

the hardware processor being configured to execute instructions to:

determine a location associated with a first client device;

assign a priority to packets, received from the first client device or targeted for the first client device, based on the location associated with the first client device and historical location information associated with the first client device, wherein the historical location information is based on a priority associated with a zone that the first client device has historically been located in;

process packets based on the priority assigned to the packets by accepting or rejecting a call based at least on the location associated with the first client device; and     reduce a number packets received to a second client device while maintaining a number of packets received by the first client device.

13. The system of claim 12, wherein the location associated with the first client device is a previous location of the first client device that is not a current location of the first client device.

14. The system of claim 12, wherein the location associated with the first client device is a location at which the first client device is located at for a majority of time that the first client device is detected.

15. The system of claim 12, wherein processing the packets comprises wirelessly transmitting the packets using transmission parameters that are based on the location associated with the first client device.

16. The system of claim 12, wherein processing the packets comprises transmitting the packets on a wired medium from available wireless and wired mediums based on the priority that is based on the location associated with the first client device.

17. The system of claim 12, wherein the hardware processor is configured to execute instructions to select session parameters for a session corresponding to the packets based on the priority assigned to the packets.

18. A method comprising:

determining a location associated with a first client device, wherein the location associated with the first client device is a previous location of the first client device that is not a current location of the first client device;

assigning a priority to packets, received from the first client device or targeted for the first client device, based on the previous location associated with the first client device and historical location information associated with the first client device, wherein the historical location information is based on a percentage of an amount of time that the first client device is located in a zone having a particular priority associated therewith;

processing packets based on the priority assigned to the packets; and     reducing a number packets received to a second client device while maintaining a number of packets received by the first client device.

19. The method of claim 18, wherein the zone is a high priority zone.

20. The method of claim 18, further comprising selecting session parameters for a session corresponding to the packets based on the priority assigned to the packets.

* * * * *